US005746986A

United States Patent [19]
Pollock et al.

[11] Patent Number: 5,746,986
[45] Date of Patent: May 5, 1998

[54] INDUSTRIAL CATALYTIC CONVERTER AND COMBINATION INDUSTRIAL CATALYTIC CONVERTER AND SILENCER

[75] Inventors: Bobby G. Pollock, Missouri City; Terry A. Segal; John E. Dusek, Jr., both of Houston; Alvin L. Bodin, Missouri City; Cyde D. Maas, Houston; Edward C. Coen, Conroe; Randall A. Pinter, Seabrook, all of Tex.

[73] Assignee: Waukesha-Pearce Industries, Inc., Houston, Tex.

[21] Appl. No.: 778,117

[22] Filed: Jan. 2, 1997

Related U.S. Application Data

[63] Continuation-in-part of Ser. No. 609,669, Mar. 1, 1996, abandoned, which is a continuation-in-part of Ser. No. 395,979, Feb. 28, 1995, abandoned, which is a continuation of Ser. No. 366,578, Dec. 30, 1994, abandoned, and a continuation-in-part of Ser. No. 395,979, Feb. 28, 1995, abandoned, which is a continuation of Ser. No. 366,578, Dec. 30, 1994.

[51] Int. Cl.[6] .............................. B01D 53/34; F01N 3/10
[52] U.S. Cl. ........................ 422/177; 422/171; 422/179; 422/180; 422/190; 422/193; 422/211; 422/221; 422/222; 181/281; 181/264
[58] Field of Search ........................ 422/171, 176–177, 422/179–180, 211, 221, 222, 190–193; 60/299; 55/DIG. 30; 181/255, 258, 264, 268, 272, 281, 275

[56] References Cited

U.S. PATENT DOCUMENTS

| | | | |
|---|---|---|---|
| 1,867,325 | 7/1932 | Neville | 55/DIG. 30 |
| 2,575,233 | 11/1951 | Plasse | 181/281 |
| 2,718,460 | 9/1955 | Bowen, III | 422/179 |

(List continued on next page.)

FOREIGN PATENT DOCUMENTS 2525660  12/1975  Germany .

OTHER PUBLICATIONS

"New cat converter design for compressors cuts service time", *Oil & Gas Journal*, United States, 1993.

"DeNo$_x$ and CO Catalytic Converters", *Johnson Matthey*, United States, pp. 1–2, 1992.

(List continued on next page.)

*Primary Examiner*—Hien Tran
*Attorney, Agent, or Firm*—Fulbright & Jaworski L.L.P.

[57] ABSTRACT

A catalytic converter for stand-alone application or for use with a novel silencer. The silencer includes a catalytic converter formed from a central housing of a size to house at least one catalytic converter element, an inlet portion connected to the inlet side of the central housing and an outlet portion connected to the outlet side of the central housing. The silencer is formed from a cylindrical housing which is secured on one end to the catalytic converter and on the opposite end to an exhaust pipe of an internal combustion engine. The cylindrical housing has at least one baffle plate transversely mounted therein. The baffle plate has a plurality of perforated conical members positioned opposite each other on each side of the baffle plate. The perforated conical members redirect the flow of exhaust gas through the silencer. A catalytic converter includes a central housing of a size to house at least one catalytic converter element, an inlet portion connected to the inlet side of the central housing and an outlet portion connected to the outlet side of the central housing. The central housing includes an opening of a size to allow insertion and removal of a catalytic converter element into and from the central housing. A door for closing the opening is hingedly attached to the central housing to close the opening. The central housing includes positioning rods, an inlet side positioning ring and an outlet side positioning ring for aligning and radially positioning respective inlet side and outlet side catalytic converter elements. Also included is a mechanical locking mechanism in the form of a camshaft assembly for axially positioning inlet side and outlet side catalytic converter elements. Improved backfire and exhaust pipe explosion protection is afforded to the catalytic converter elements by an improved backfire support structure.

67 Claims, 10 Drawing Sheets

U.S. PATENT DOCUMENTS

| | | | |
|---|---|---|---|
| 2,989,137 | 6/1961 | Reese | 181/264 |
| 3,841,842 | 10/1974 | Wiley | 422/179 |
| 3,889,464 | 6/1975 | Gardner | 60/288 |
| 3,938,232 | 2/1976 | Noda et al. | 29/890 |
| 4,043,761 | 8/1977 | Gaysert et al. | 422/179 |
| 4,161,509 | 7/1979 | Nowak | 422/179 |
| 4,220,625 | 9/1980 | Toh et al. | 422/180 |
| 4,238,455 | 12/1980 | Ogiwara | 422/171 |
| 4,239,733 | 12/1980 | Foster et al. | 422/179 |
| 4,269,807 | 5/1981 | Bailey et al. | 422/179 |
| 4,322,386 | 3/1982 | Masutomi et al. | 422/171 |
| 4,407,785 | 10/1983 | Pfefferle | 422/171 |
| 4,536,371 | 8/1985 | Thayer et al. | 422/171 |
| 4,581,206 | 4/1986 | Otani et al. | 422/171 |
| 4,601,168 | 7/1986 | Harris | 60/299 |
| 4,709,549 | 12/1987 | Lepperhoff | 422/179 |
| 4,843,815 | 7/1989 | Smojver | 60/299 |
| 4,849,185 | 7/1989 | Wittig | 422/171 |
| 5,016,438 | 5/1991 | Harris | 60/299 |
| 5,043,147 | 8/1991 | Knight | 422/180 |
| 5,062,263 | 11/1991 | Carboni | 422/176 |
| 5,169,604 | 12/1992 | Crother, Jr. | 422/177 |

OTHER PUBLICATIONS

"Equinox Catalytic Converters", *Miratech Corporation*, Tulsa, Oklahoma, pp. 1–3, 1992.

"IC engine emissins compliance. You can get there . . . ", *Johnson Matthey*, United States, pp. 1–4, 1990.

"Gas Engine Performance & Emissions Enhanced With Combination Converter/Silencer", *Diesel Progress, Engines & Drives*, pp. 34, 36.

"A Cleaner Environment . . . Now and in the Future", DCL Industries, Inc., Oct. 1995.

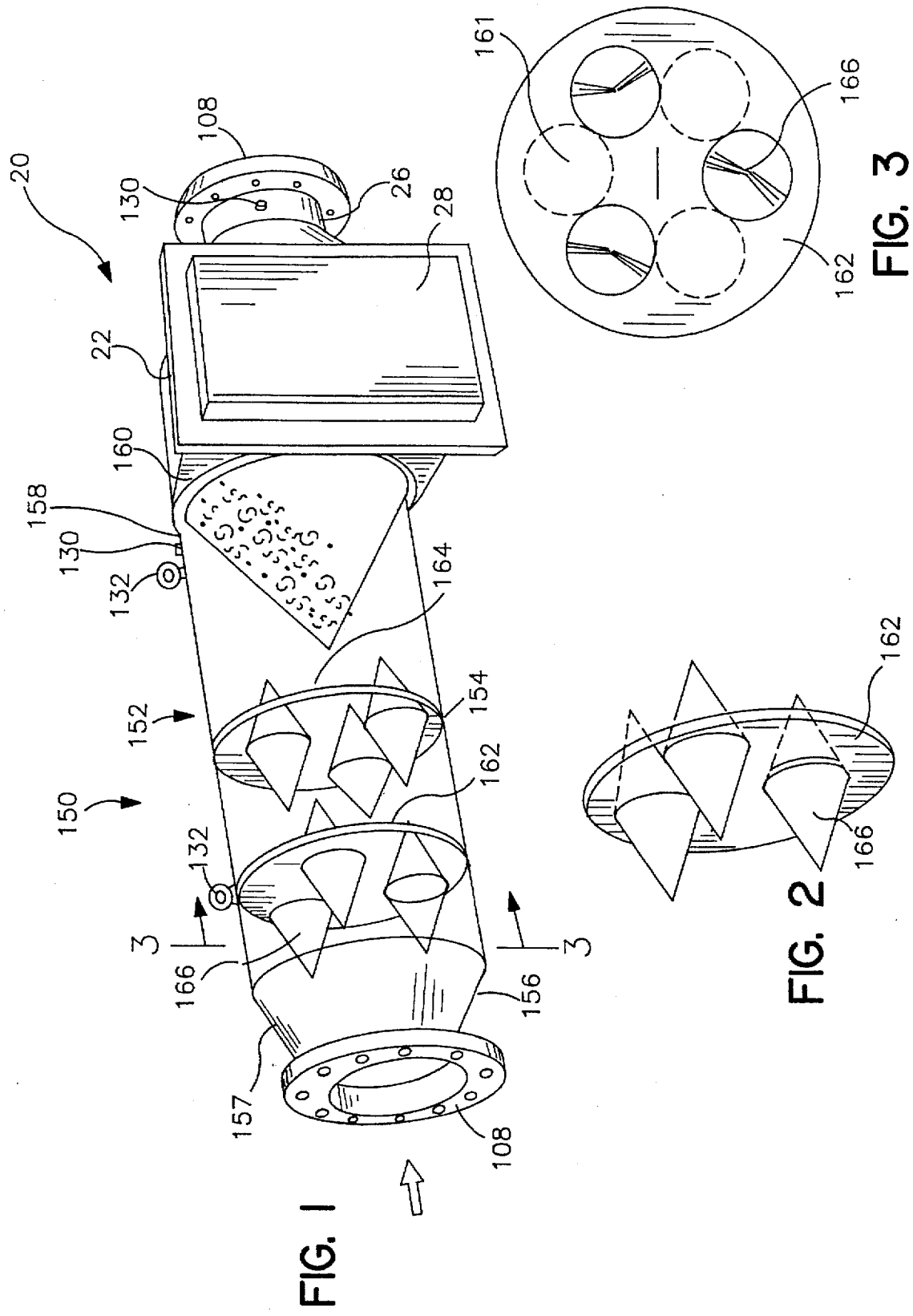

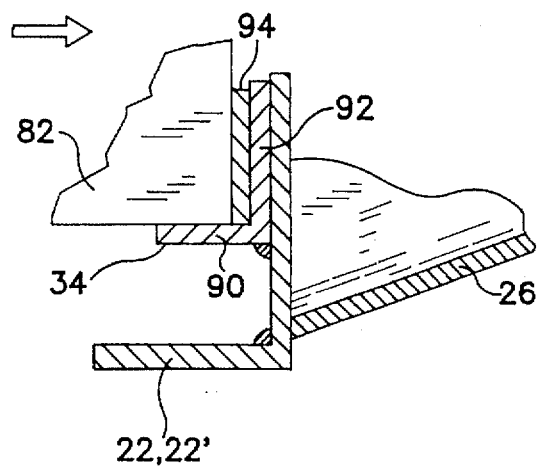
FIG. 10
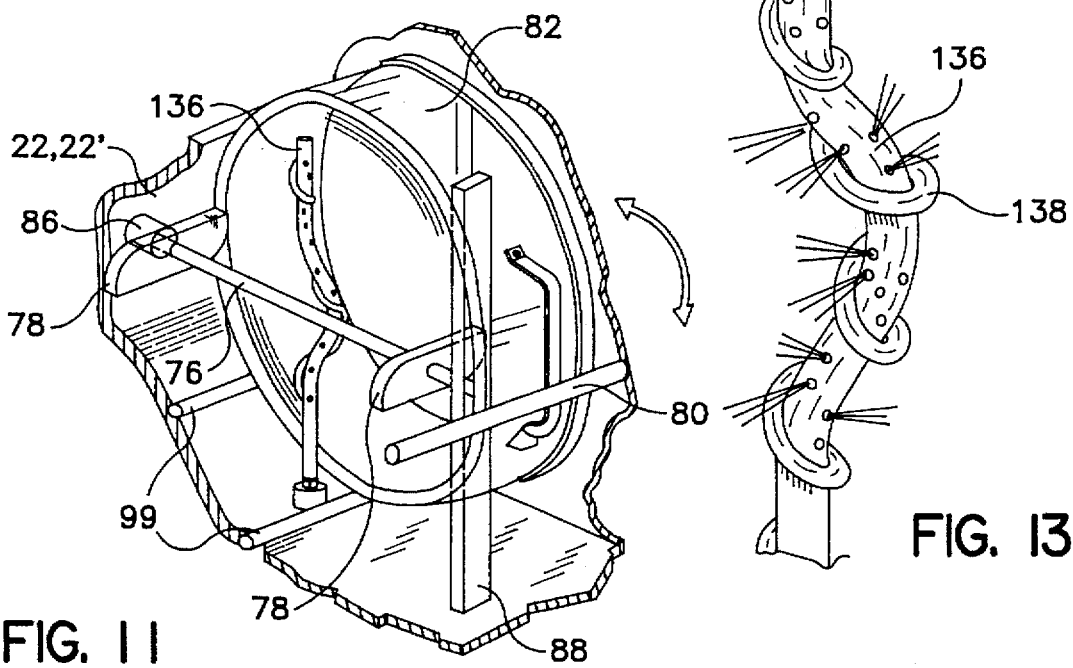
FIG. 11
FIG. 13
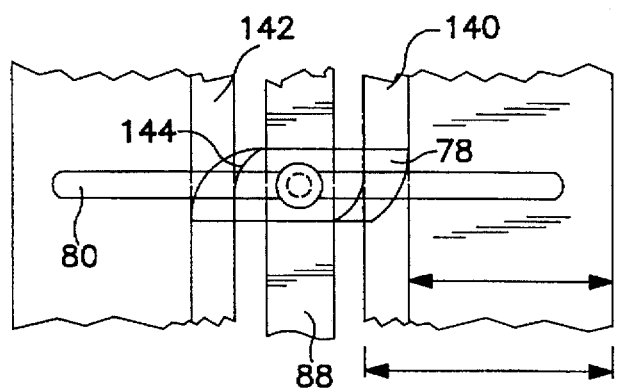
FIG. 12

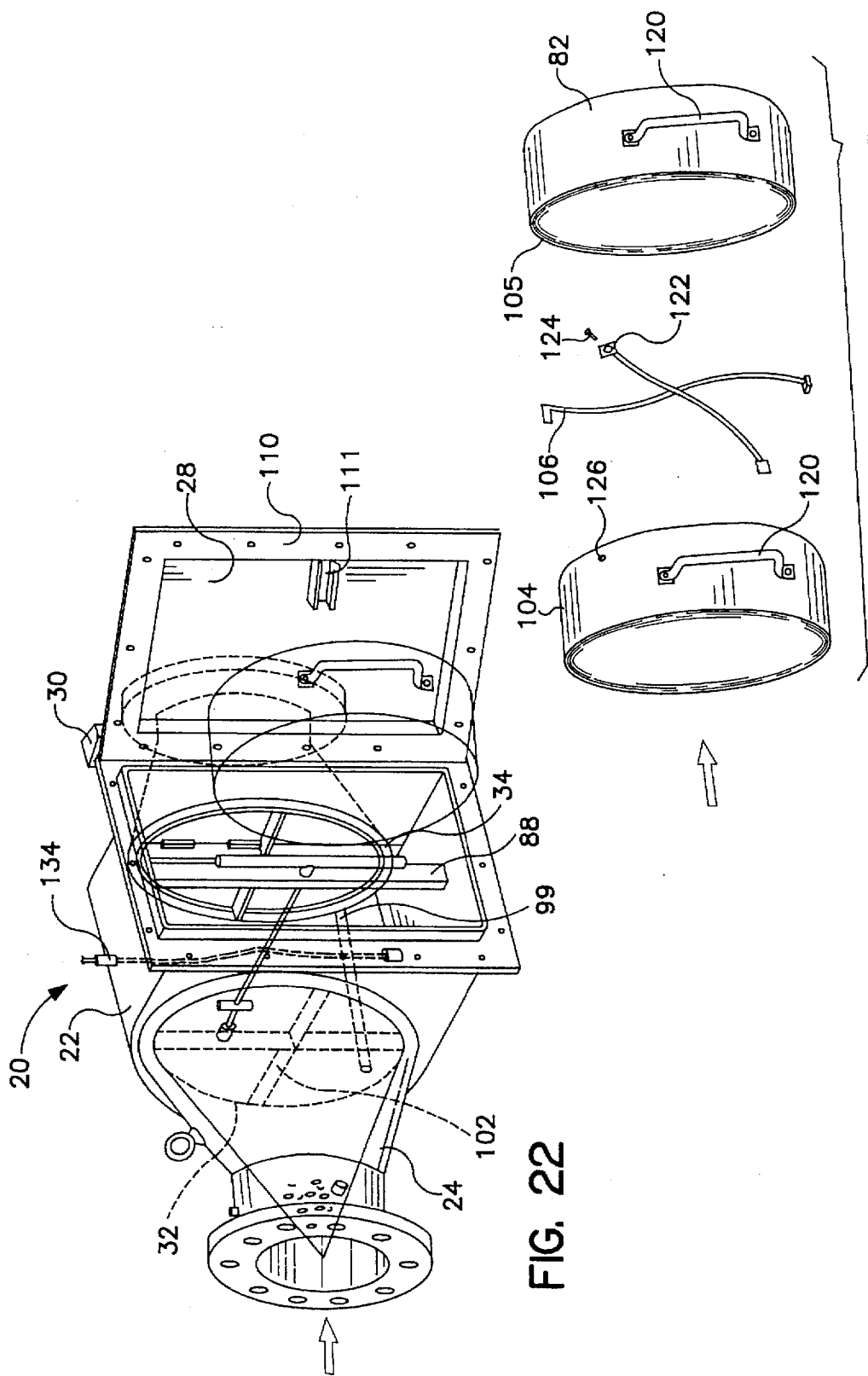

INDUSTRIAL CATALYTIC CONVERTER AND COMBINATION INDUSTRIAL CATALYTIC CONVERTER AND SILENCER

RELATED APPLICATIONS

This application is a continuation-in-part of application Ser. No. 08/609,669, filed Mar. 1, 1996, now abandoned which is a continuation-in-part of application Ser. No. 08/395,979, filed Feb. 28, 1995, now abandoned which is a continuation of application Ser. No. 08/366,578, filed Dec. 30, 1994, now abandoned and a continuation-in-part of application Ser. No. 08/395,979, filed Feb. 28, 1995, which is a continuation of application Ser. No. 08/366,578, filed Dec. 30, 1994.

FIELD OF THE INVENTION

The present invention, according to one aspect, relates to a combination catalytic converter and silencer and, in particular, to an industrial combination catalytic converter and silencer that provides improved service and replacement accessibility, improved exhaust gas velocity control and improved noise attenuation, among other advantages. Another aspect of the present invention relates to a catalytic converter and, in particular, to an industrial catalytic converter that provides improved service and replacement accessibility.

BACKGROUND OF THE INVENTION

Catalytic converters have been used in industrial applications for many years. Particularly, industrial catalytic converters have been utilized to treat exhaust gases from industrial engines. These catalytic converters comprise two basic components—a converter housing and a catalytic element. The converters, and particularly the elements therein, utilize the proven process of reduction of nitric oxides (NOx), carbon monoxide (CO), and hydrocarbons (HC) when passed over a surface of certain precious metals. The metals, generally referred to as "Noble" metals, include platinum, palladium, and rhodium. When engine exhaust gases containing NOx, CO, and HC, in conjunction with both a sufficient exhaust temperature and a slightly rich stoichiometric air fuel ratio, are brought in close contact with these "Noble" metals, a chemical reaction takes place. The reaction process converts the NOx, CO, and HC into carbon dioxide ($CO_2$), water vapor ($H_2O$), and free nitrogen $N_2$.

Over time, exhaust gas residue builds up or contaminates the element requiring that the converter, and particularly the element, be serviced. Additionally, operating factors, such as engine backfires, may damage the element and, thus, require replacement of same. Such service and/or replacement is increasingly necessary to maintain compliance with increasingly demanding environmental requirements.

In order to perform such service or repair on early converter designs, it was necessary to disassemble and remove the converter from the exhaust gas flowstream. Such disassembly was often time-intensive and labor-intensive since a converter is connected to other gas components, both at its inlet and outlet ends, oftentimes by a series of bolts. In addition, the exhaust gas line in many cases is elevated or positioned such that removal of the converter from its in-line position to a work area, where the converter can be disassembled to provide access to the catalytic element, is an involved process requiring men and lifting machinery.

More recently, catalytic converters have been designed to allow in-line access to the element(s), thus avoiding the disassembly and repositioning problems of the earlier converters. U. S. Pat. No. 5,169,604 issued to Crothers, Jr., discloses a catalytic converter in which the elements can be accessed without removing the converter from its in-line position. This is accomplished by the inclusion of a detachable and removable hatch. While decreasing the time and effort necessary to service or replace elements, the design still requires substantial handling of various loose components including the elements, a loose retainer placed between the elements, and the hatch itself.

In addition, catalytic converters are oftentimes used in applications requiring noise abatement. Silencers have been used, and sometimes combined with catalytic converters, to achieve noise control and emissions control with one piece of equipment. U.S. Pat. No. 4,601,168 issued to Harris, discloses a combination catalytic converter and silencer in which silencer tubes are positioned before and after the catalyst module and supports. The silencer tubes are longitudinal tubes having openings therein to redirect, and thus silence, and pass the emissions through the unit.

While disclosing the basic concept of a combination of a catalytic converter and silencer, the combination suffers the deficiency of requiring disassembly of the unit to replace the catalyst elements. Furthermore, the relatively simple perforated-tube silencer structure can be improved.

An additional problem encountered in the operation of all catalytic converters, either alone or in combination with silencers, is deformation of and damage to the catalytic converter element resulting from backfire or exhaust pipe explosion.

SUMMARY OF THE INVENTION

Accordingly, it is an object of the present invention to overcome the disadvantages of prior industrial catalytic converters, as well as prior combination industrial catalytic converters and silencers.

Particularly, it is an object according to one aspect of the present invention to provide a combination catalytic converter and silencer in which the catalytic converter elements can be serviced and replaced quickly and easily.

It is a further object of the invention to provide a combination catalytic converter and silencer wherein the internal catalytic converter elements can be changed in-line, i.e., while the converter remains connected to the exhaust pipe structure.

It is another object of the present invention to provide a combination catalytic converter and silencer that minimizes handling and movement of components.

It is another object of the present invention is to provide a combination catalytic converter and silencer in which the catalytic element is the only loose component that requires handling during element servicing.

It is yet another object of the present invention to provide an improved silencer in combination with a catalytic converter in which the entire combination is constructed as a single unit which is then connected to the exhaust pipe structure of an internal combustion engine and which allows the catalytic converter elements to be quickly and easily replaced.

Yet another object is to provide a combination catalytic converter and silencer which affords increased protection to the catalytic converter elements against backfire and exhaust pipe explosion.

Still yet another object is to provide a combination catalytic converter and silencer which provides improved handling and noise control.

In accordance with another aspect of the present invention it is an object of the present invention to provide a catalytic converter in which the catalytic converter elements can be serviced and replaced quickly and easily.

It is a further object of the invention to provide a catalytic converter wherein the internal catalytic converter elements can be changed in-line, i.e., while the converter remains connected to the gas exhaust pipe structure.

It is yet another object of the present invention to provide a catalytic converter that minimizes handling and movement of components.

Yet another object of the present invention is to provide a catalytic converter in which the element is the only loose component that requires handling during element servicing.

These and other objects of the present invention are achieved according to the aspect of the present invention directed to the combination catalytic converter and silencer, by a combination catalytic converter and silencer, in which the catalytic converter comprises a central housing having an inlet side, an outlet side and an opening therein of a size to allow insertion and removal of one or more catalytic converter elements, means for selectively sealing the opening, means for axially and radially positioning one or more catalytic converter elements in the housing and improved backfire and exhaust pipe explosion protection supports and the silencer comprises a cylindrical housing containing improved exhaust gas redirection means located within the housing.

In a preferred embodiment, the exhaust gas redirection means comprises a pair of transversely mounted baffle plates. Each of the baffle plates has three aligned perforated conical members extending from each side of the baffle plate. The perforated conical members redirect and diffuse the exhaust gas passing through the cylinder. In a preferred embodiment, one baffle plate is rotated 60° relative to the other baffle plate. One end of the cylindrical housing has an inlet which includes attachment means for attaching the housing to an exhaust pipe of an internal combustion engine and the other end of the cylindrical housing is attached to the inlet side of the central housing.

According to a preferred embodiment relating to the catalytic converter, both in combination with the silencer and in a stand-alone mode, the means for axially and radially positioning the catalytic converter elements comprises a camshaft assembly disposed within the central housing for axially positioning the catalytic converter elements. The camshaft assembly may include a camshaft transversely disposed in the central housing, means for supporting the camshaft in the central housing, one or more cams disposed on the camshaft, and means for rotating the camshaft. The means for supporting the camshaft may comprise a bearing disposed on an interior surface of the central housing for rotatably receiving a first end of the camshaft, and a camshaft support beam disposed within the central housing and exhibiting an opening therein for rotatably supporting a second end of the camshaft. The opening in the camshaft support beam may include a notched portion for permitting removal of the camshaft from the central housing. Locking means may also be provided for releasably securing the camshaft against rotation when the catalytic converter is in operation.

The means for axially and radially positioning the catalytic converter may further comprise a plurality of positioning rings positioned on an interior surface of the central housing for radially positioning the catalytic converter elements. According to a preferred embodiment, the catalytic converter includes an inlet positioning ring located on the inlet side of the central housing and an outlet positioning ring located on the outlet side of the central housing. Each positioning ring exhibits a substantially L-shaped cross-section including an axially extending portion for preventing radial movement of a catalytic converter element seated therein and a radially inwardly extending portion for preventing axial movement of the catalytic converter element. Also included in the central housing are positioning members, for example, in the shape of rods, bars or similar shapes. Upon insertion, the elements rest against the members, which align the elements for receipt within the positioning rings. Sealing means, preferably in the form of a sealing ring disposed between the radially inwardly extending portion of the positioning ring and an axial face of the seated catalytic converter element, may be provided to prevent the flow of gas between the positioning ring and the catalytic converter element seated therein.

A door exhibiting a seal surrounding the interior peripheral surface thereof, may be provided for selectively covering and sealing the opening when the door is in the closed position. The means for selectively sealing the opening may further include a plurality of fasteners disposed about the peripheral surface of the opening. The fasteners are configured to sealingly secure the door to the peripheral surface of the opening in the central housing when the door is in the closed position. The fasteners may include a plurality of threaded fasteners protruding from the peripheral surface of the opening and configured to extend through a corresponding plurality of openings in the door in the closed position. A corresponding plurality of nuts are then threadably attached to the plurality of threaded fasteners to tighten the seal about the opening. According to an alternative preferred embodiment, the fasteners may include a plurality of over-center type latches attached about the periphery of the door and a corresponding plurality of bosses protruding from the periphery of the opening in the central housing. Each of the latches may include means for adjusting the applied torque. The door is preferably attached to the central housing by a hinge.

According to one embodiment, a single catalytic converter element is removably located within the central housing of the catalytic converter. In another embodiment, two elements are utilized with one catalytic converter element disposed in the inlet side of the central housing and another catalytic converter element disposed in the outlet side of the central housing. Other embodiments may utilize more than two elements on either the inlet side, outlet side, or both for more severe applications.

A deformation preventing member may also be attached to a downstream side of the inlet side catalytic converter element. Support members attached to an interior surface of both the inlet side and outlet side of the central housing and abutting an axial face of the corresponding catalytic converter element may be provided. Each catalytic converter element may include a handle for assisting insertion and removal from the opening in the central housing. According to one embodiment, the camshaft assembly is located in the central housing between the inlet side catalytic converter element(s) and the outlet side of the catalytic converter element(s).

According to a preferred embodiment, the improved backfire and exhaust pipe explosion protection supports may include a midcamshaft landing disposed on a deformation prevention member attached to a downstream side of the inlet side catalytic converter element and a midcamshaft cam for contacting the midcamshaft landing. Support members attached to an interior surface of both the inlet side and outlet side of the central housing and abutting an axial face of the corresponding catalytic converter element may also be provided. Additional backfire support may also be provided by outlet backfire support means generally comprising three support braces connected between support members on the outlet side of the central housing and an interior surface of a downstream portion of the central housing outlet. Each catalytic converter element may include a handle for assisting insertion and removal from the opening in the central housing. According to one embodiment, the camshaft assembly is located in the central housing between the inlet side catalytic converter element(s) and the outlet side of the catalytic converter element(s).

These and other features, aspects and advantages of the present invention will become better understood with regard to the following description, claims and accompanying drawings.

BRIEF DESCRIPTION OF THE DRAWINGS

The drawings are hereby expressly made a part of the specification.

FIG. 1 is a perspective view of one embodiment of one aspect, i.e., the combination catalytic converter and silencer, of the invention;

FIG. 2 is a perspective view of the exhaust gas redirection means of the silencer means;

FIG. 3 is a cross-sectional view partially in cutaway taken along line 3—3 of FIG. 1;

FIG. 10 is an enlarged view partially in section showing a positioning ring;

FIG. 11 is a fragmentary view showing the camshaft assembly;

FIG. 12 is a side elevational view partially illustrating the camshaft assembly;

FIG. 13 is a perspective view of an oxygen supply tube;

FIG. 22 is a perspective view of the catalytic converter of FIG. 20 showing the cam shaft assembly; and FIG. 23 is a perspective view of the inlet and outlet side catalytic converter elements and the deformation prevention member.

DETAILED DESCRIPTION OF THE PREFERRED EMBODIMENTS

Figure 4:
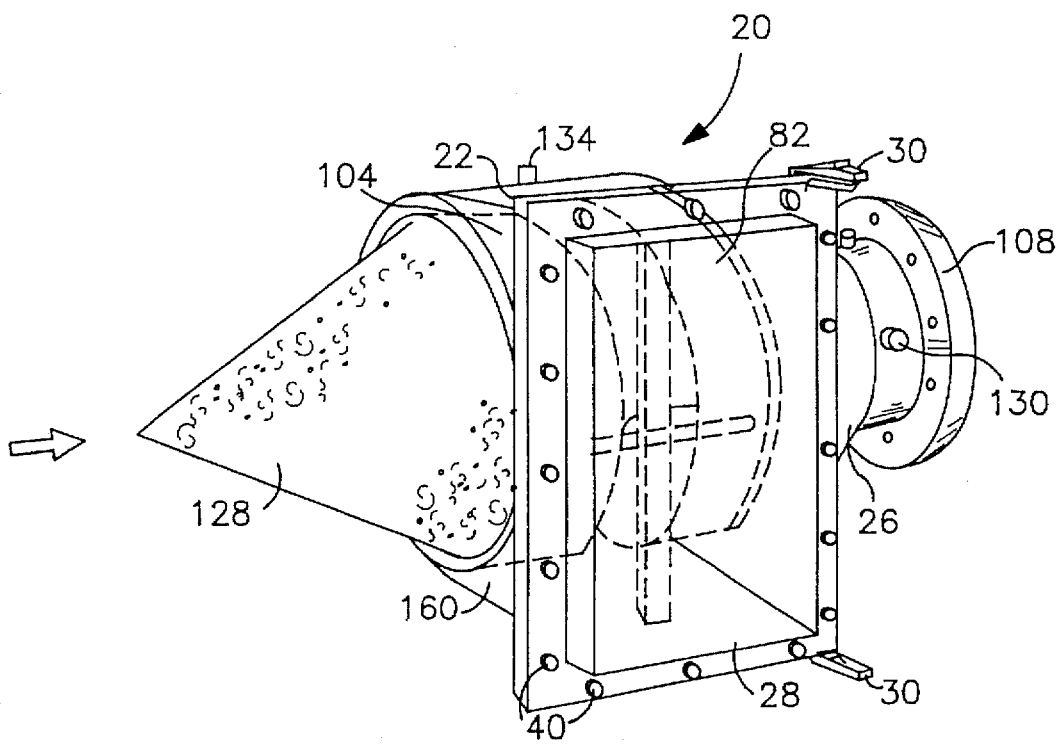
FIG. 4 is a perspective view of one embodiment of the catalytic converter of the present invention.

FIG. 1 shows one embodiment, shown generally by the reference numeral 150, of the combination catalytic converter and silencer of the present invention. The silencer, shown generally by the reference numeral 152, is formed from a cylindrical housing 154 having an inlet portion 156 which generally comprises a frusto-conical shaped cone 157 and a mounting flange 108 for attaching to an exhaust pipe of an internal combustion engine. An outlet portion 158 attaches to the inlet side 160 of the central housing 22 of the catalytic converter shown generally by the reference numeral 20. In the preferred embodiment the cylindrical housing 154 is formed of 10 gauge carbon steel, although the exact composition of the material is not critical and it will be understood by others of skill in the art that a variety of suitable materials may be utilized, such as $3/16$" carbon steel. The length and diameter of the cylindrical housing will vary with the particular application; however, it is desirable that the width/length ratio be approximately $2/3$ thus, the length of the cylindrical housing 154 should be approximately one and one-half times the width.

Contained within the cylindrical housing 154 are exhaust gas redirection means comprising at least one baffle plate 162 as shown in FIGS. 2 and 3. In the preferred embodiment, first and second baffle plates 162 and 164 are contained within the cylindrical housing 154. As shown in FIG. 2, the baffle plates 162 and 164 have a plurality of openings 161. In a preferred embodiment, a baffle plate comprises at least three openings 161 positioned approximately equally about a radius of the plate. Extending longitudinally from each opening is a perforated conical member 166. Preferably, the members 166 are positioned opposite each other and extend along the longitudinal axis of the cylindrical housing 154, i.e., a first member extends in the upstream direction and a second member positioned opposite the first member extends in the downstream direction and so on about the baffle plate. Particularly, if three members 166 are used per side, the perforated conical members are generally placed at 120° intervals around the baffle plate and tending towards the perimeter of the baffle plate as shown in FIG. 3. In the preferred embodiment, the area of the opening of a conical member 166 is at least one and one-half times the area of the respective opening 161 of the baffle plate from which it extends. Such a geometry provides improved noise attenuation. The baffle plates 162 and 164 are sized to be snugly placed inside the cylindrical housing 154 and are then welded to the cylindrical housing 154, thereby forming an airtight seal and forcing the entirety of the exhaust gas to pass through the perforated conical members 166 of the baffle plates 162 and 164. In the preferred embodiment, the baffle plates are formed from 10 gauge carbon steel and have a thickness of $1/8$". The perforated conical members 166 are formed of stainless steel to provide increased corrosion resistance. In general, all of the internal elements of the combination catalytic converter and silencer 150 which are in direct contact with the exhaust gas are formed of corrosion resistant stainless steel. Further, in a preferred embodiment, the perforated conical members of the second baffle plate 164 are rotated 60° relative to the perforated conical members of the first baffle plate 162 thereby creating maximum redirection of the exhaust gas.

As shown in FIG. 1, the outlet portion 158 of the cylindrical housing 154 is attached to the inlet side 160 of the central housing 22.

FIG. 4 shows a first embodiment 20 of the catalytic converter of the present invention. The converter 20 includes a central housing 22 having an inlet side 160 and an outlet portion 26. The inlet side 160 forms a generally flat face for connecting to the outlet portion 158 of the cylindrical housing 154. In the preferred embodiment the outlet portion 158 of the cylindrical housing 154 is welded to the inlet side 160 of the central housing 22. The outlet portion 26 of the central housing 22 has a generally frusto-conical shape. A mounting flange 108 is provided on the outlet portion 26 for mounting to the exhaust pipe of an internal combustion engine. A conically shaped diffuser element member or diffuser element 128 extends from the inlet side 160 into the cylindrical housing 154. The diffuser element 128 is formed of corrosion resistant stainless steel. Lifting eyes 132 may be attached to the combination catalytic converter and silencer 150 for handling purposes (see FIG. 1).

Figure 20:
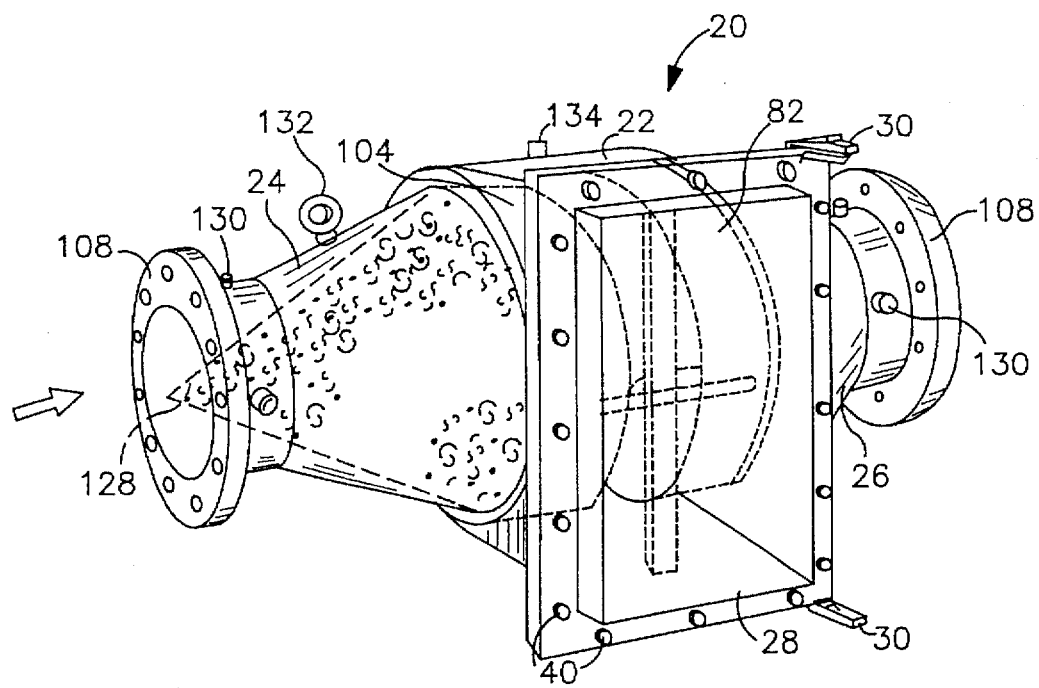
FIG. 20 is a perspective view of a first embodiment of another aspect, i.e., the stand-alone catalytic converter, of the invention.

FIG. 20 shows another embodiment of the catalytic converter 20. In this embodiment, the catalytic converter 20 is in the stand-alone construction in accordance with another aspect of the present invention. Referring now to FIG. 20, elements similar to elements of the combination apparatus of FIGS. 1 and 4 will have similar reference numbers. The converter 20 includes a central housing 22 connected to an inlet portion 24 and an outlet portion 26. The inlet and outlet portions 24, 26 have generally frusto-conical shapes. Mounting flanges 108 are provided on the inlet and outlet portions 24, 26 for mounting to the exhaust pipe of an internal combustion engine. The inlet side 24 with the perforated inlet member or diffuser element 128 is mounted upstream of the outlet portion 26. Lifting eyes 132 may be attached to the converter 20 for handling purposes.

Referring now to both aspects of the invention as shown in FIGS. 1–4 and 20, the central housing 22 has an opening therein for insertion and removal of catalytic converter elements 82, 104. The opening in the central housing 22 is closed by a door 28. The door 28 is mounted on the central housing 22 by hinges 30. A means for securing the door 28 to the central housing 22 is, for example, by fasteners 40, such as studs. The fasteners 40 are located around the entire perimeter of the door 28 and, preferably, are substantially equally spaced apart. Preferably, the equal spacing insures uniform sealing pressures about the periphery of the door.

Figure 8:
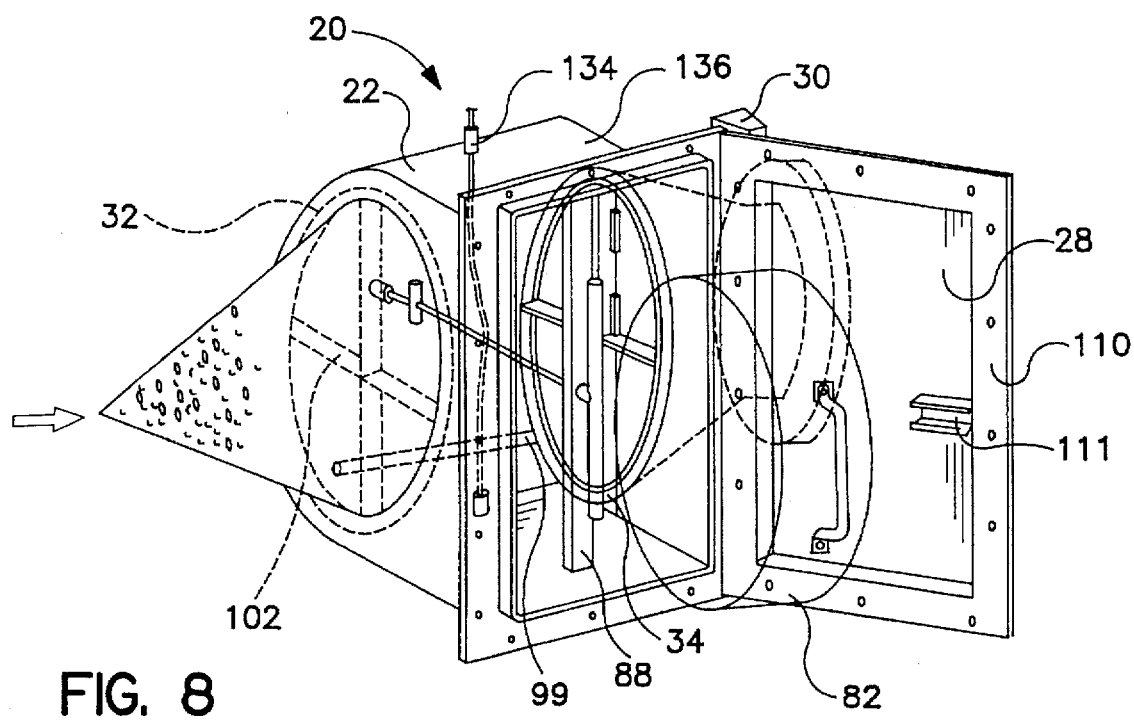
FIG. 8 is a perspective view of the embodiment of the catalytic converter of FIG. 4 showing the camshaft assembly and the door and sealing means.

To position the catalytic converter elements 104, 82 in the central housing 22, the converter 20 includes an inlet side positioning ring 32 and an outlet side positioning ring 34 (see FIG. 8). As shown in phantom lines in FIGS. 4 and 20, the converter 20 may house an inlet side catalytic converter element 104 and an outlet side catalytic converter element 82. Alternatively, only one element may be used and may be positioned in either the inlet side or outlet side of the housing depending upon application. For example, the single element is often placed in the outlet side when the converter is used in a horizontal position and in the inlet side when used in a vertical position.

In addition, more than two elements may be used. This is accomplished by extending the central housing 22 to accommodate, for example, two or more inlet side elements, two or more outlet side elements, or both.

Referring to FIG. 1, exhaust gas from an internal combustion engine enters the combination catalytic converter and silencer 150 through the inlet portion 156 of the cylindrical housing 154 and is then passed through a first baffle plate 162 and a second baffle plate 164. The passage of the exhaust gas over the baffle plates redirects the flow of exhaust gas passing through the cylindrical housing 154, thereby attenuating the noise produced by the internal combustion engine to which the combination catalytic converter and silencer 150 is connected. In the preferred embodiment, three perforated conical projections 166 extend from each side of their respective baffle plates.

After passing through the second baffle plate 164, in the combination converter and silencer aspect of the present invention or into the inlet portion 24 of the stand-alone catalytic converter aspect of the present invention, the exhaust gas impinges against the perforated diffuser element 128. The element 128 provides further sound attenuation and backfire protection, while maintaining low backpressure. The element 128 diffuses the exhaust over the entire element 104. Without the diffusing element 128, the exhaust gas tends to concentrate in the center of element 104. In one embodiment, the element 128 is in the shape of a cone.

Depending on the application, the exhaust gas passes through one or two catalytic converter elements 104, 82 and then out the outlet portion 26 and into the remainder of the engine exhaust line. While element design may vary, a preferred element comprises a stainless steel foil, round, monolithic, honeycomb structure. A stainless steel band 105 around each element helps maintain a perfectly round element -one that will not unwind in normal service, handling or cleaning. Each element 82, 104 includes a handle 120 for easy removal or replacement of the element.

Exhaust gas passing through the central housing 22 is prevented from escaping around the catalytic converter elements and thereby bypassing the treatment process by an axial seal formed between the inlet and outlet side positioning rings 32, 34 (FIG. 8) and the catalytic converter elements 104, 82 and by the sealing action of the door 28. The details of the axial seals and the sealing action of the door will now be discussed in detail beginning with the axial seals. For purposes of simplicity, identical features and elements between the first and second embodiments of the catalytic converter will be referred to by the same reference numeral throughout with a prime "'" denoting the feature or element associated with the second embodiment.

A mechanical locking device in the form of a camshaft assembly 74 (FIG. 11) for mechanically locking one element 82 or two elements 82, 104 in place against a sealing member positioned in positioning ring 34 (one element) or respective positioning rings 34, 32 (two elements) to ensure the positive, axial seal. The camshaft assembly includes a camshaft 76 transversely disposed in the central housing 22, 22' and at least two cams 78 disposed on the camshaft 76. The camshaft assembly is formed of corrosion resistant stainless steel. A means for rotating the camshaft 76 may be a T-handle 80. A means for supporting the camshaft 76 includes a bearing 86 attached to the central housing 22, 22' at one end and a camshaft support beam 88 mounted in the central housing and having a hole formed therein for receiving the shaft 76. The relative dimensions of the central housing 22, 22', the catalytic converter elements 82, 104 and the cams 78 are such that when the camshaft 76 is in a locked position, the cams 78 bear against the catalytic converter element or elements to axially lock them in place against the positioning rings 34, 32 in the central housing. More specifically, this axial lock also forces the element(s) against the seal(s) 94 to positively seal the structure thus forcing the exhaust gas to pass across and through the element(s) 82, 104. The elements may be unlocked by rotating the camshaft 76 so that the cams 78 no longer contact the elements.

As shown in FIG. 12, when larger catalytic converter elements 140, 142 (shown in phantom lines) are needed, smaller cams 144 may be used (also shown in phantom lines). In one approach, smaller cams 144 may be mounted on a separate camshaft. According to this embodiment, the camshaft 76 with the cams 78 is removed and replaced with another camshaft having the smaller cams 144 mounted thereon. The procedure for changing the camshaft is discussed below.

Figure 14:
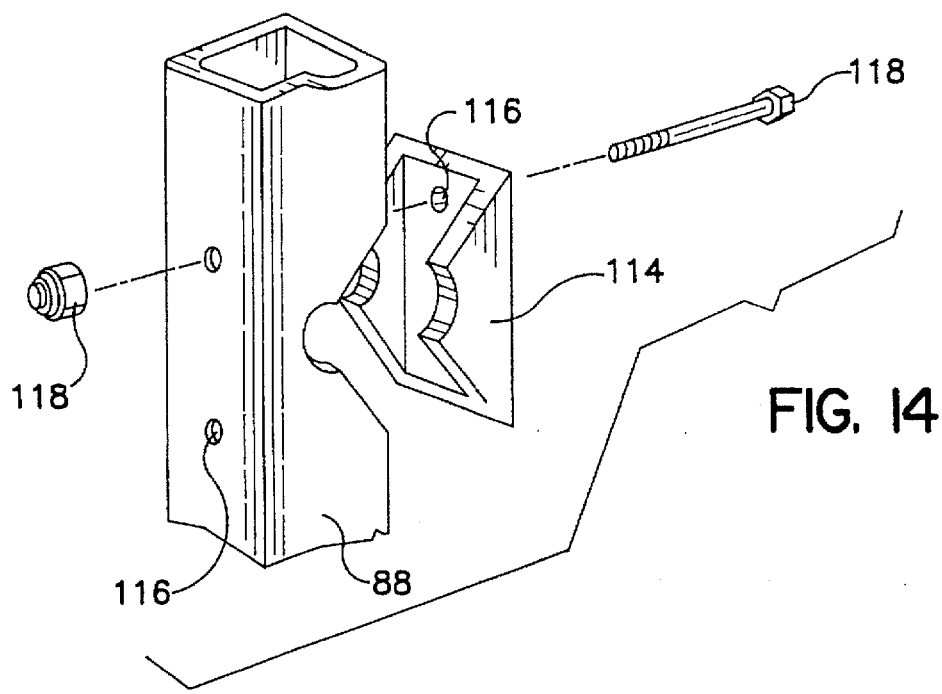
FIG. 14 is a partial exploded view of the camshaft support beam.

FIG. 14 shows an enlarged fragmentary view of the camshaft support beam 88. To change the cams from one size to another, another camshaft having the different sized cams mounted thereon is installed. To install another camshaft, a notched portion 114 of the camshaft support beam 88 is removed. Holes 116 are formed in both the notched portion 114 and the remaining portion of the camshaft support beam 88. The notched portion 114 is secured to the beam 88 by fasteners 118. The fasteners 118 are loosened, and the notched portion 114 is removed so that the camshaft 76 may be transversely removed from the beam 88 and a new camshaft inserted. The notched portion 114 is then reattached to the beam 88 by fasteners 118. Thus, the camshaft mechanism can be serviced at a minimum expenditure of time and component handling. Further, such servicing can normally be performed while the converter remains inline. Hence, the present converter allows for reconfiguring as is necessary to address more or less stringent emissions regulations.

In a preferred embodiment, the camshaft assembly is locked in position by a cam handle locking device 111 (FIG. 8). For example, upon proper locking engagement of the element(s) by the cams 78, the camshaft assembly and particularly the T-handle 80, is secured in position by the locking device 111 to prevent disengagement of the camshaft assembly.

Figure 15:
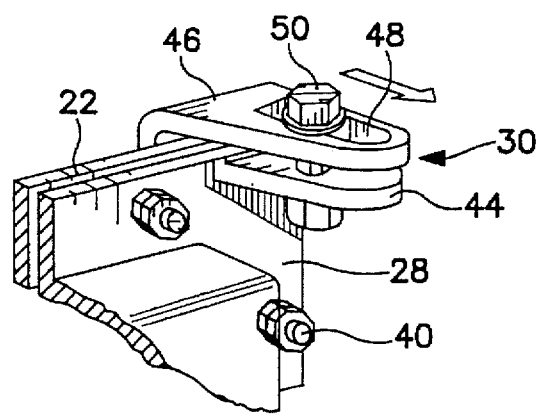
FIG. 15 is a fragmentary view of the embodiment of FIG. 4 showing a hinge.

The operation and sealing action of the door will now be discussed in detail. FIG. 15 is an enlarged view of the hinge 30 of the first embodiment 20. One bracket 44 of the hinge 30 is attached to the door 28. A second bracket 46 is attached to the central housing 22. The brackets may be attached by, for example, welding. An elongated hole 48 is formed in the bracket 46. A fastener 50 connects the brackets 44, 46. When the door 28 is opened, because of the elongated hole 48, the door is able to slide away from the central housing 22 and swing open to allow access to the interior of the central housing 22. This structure allows unimpeded access to the elements 82, 104 without having to handle the door as a loose component and facilitates realigning and reattaching of the door.

Because the door 28 is hinged to the central housing 22, the door may be conveniently swung open for replacement of the catalytic converter elements 82, 104. In contrast, in prior devices, the door was not hingedly attached to the converter and had to be lifted by hand or machine away from the opening to allow access to the catalytic converter elements.

Figure 5:
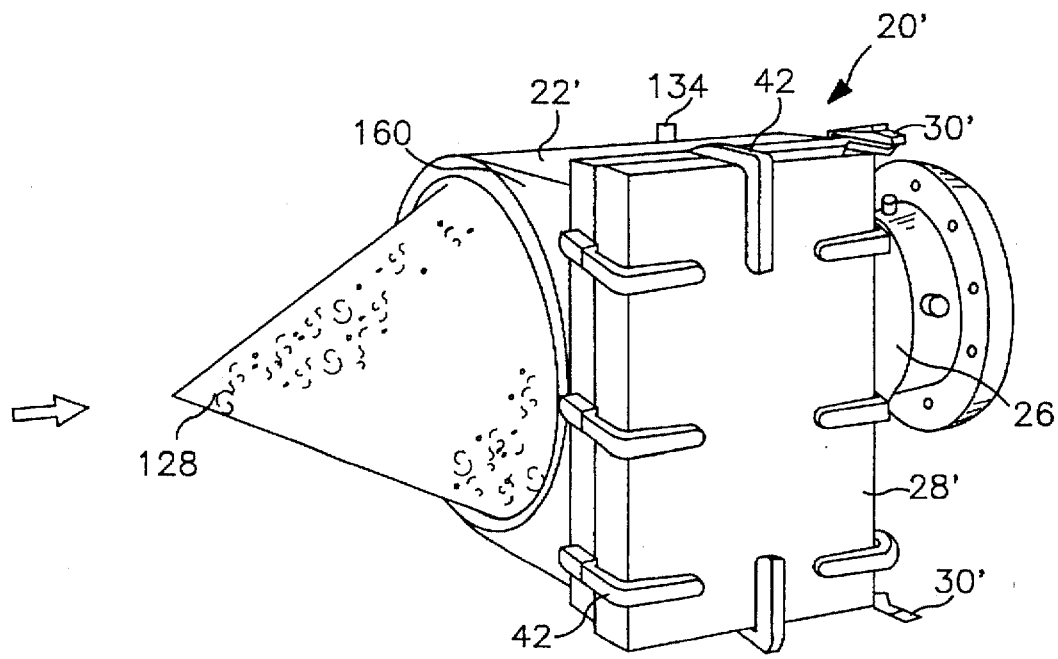
FIG. 5 is a perspective view of a second embodiment of the catalytic converter of the present invention.
Figure 21:
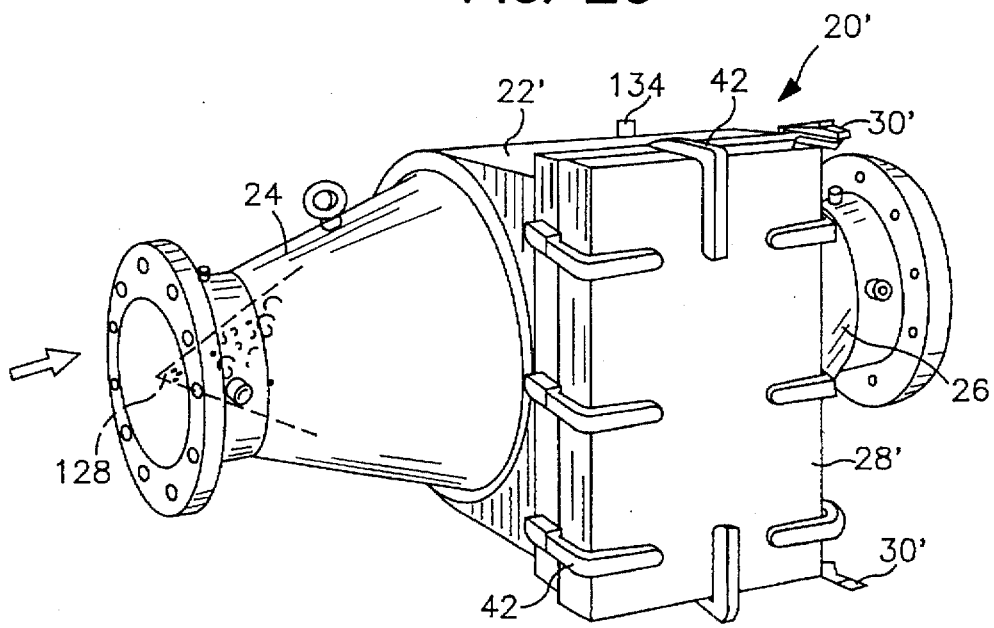
FIG. 21 is a perspective view of a second embodiment of the stand-alone catalytic converter of the present invention.

FIGS. 5 and 21 show a second embodiment 20' of the catalytic converter. The second embodiment 20' includes a central housing 22', a door 28' and hinges 30'. The door 28' is secured to the central housing 22' by over-center type latches 42. In the second embodiment 20' the catalytic converter element(s) can be removed, inspected, or replaced without the use of any tools. The over-center type latches 42 are located completely around the perimeter of the door 28' thereby ensuring a positive, uniform seal between the door 28' and the central housing 22'. Preferably, the number of latches 42 is eight. As shown in the FIGS. 4, 5, 20 and 21, the doors 28, 28' are rectangular in shape, although other shapes are possible.

The second embodiment 20' functions similarly to the first embodiment 20. The principal difference between the first and second embodiments is that the second embodiment uses over-center type latches 42 to secure the door 28' to the central housing 22' while the first embodiment 20 uses fasteners 40 to secure the door 28 to the central housing 22. Preferably, both embodiments 20, 20' of the converter are made of steel, most preferably stainless steel.

Figure 16:
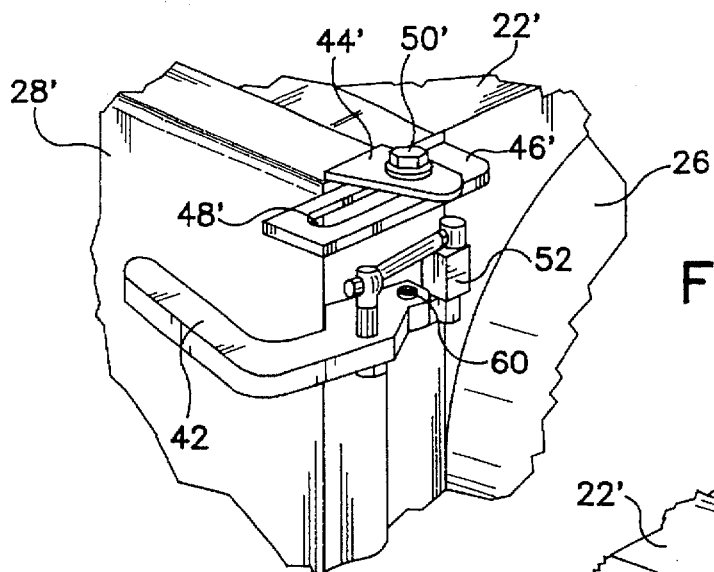
FIG. 16 is a fragmentary view of the embodiment of FIG. 5 showing hinge and latch assemblies in a closed condition.
Figure 17:
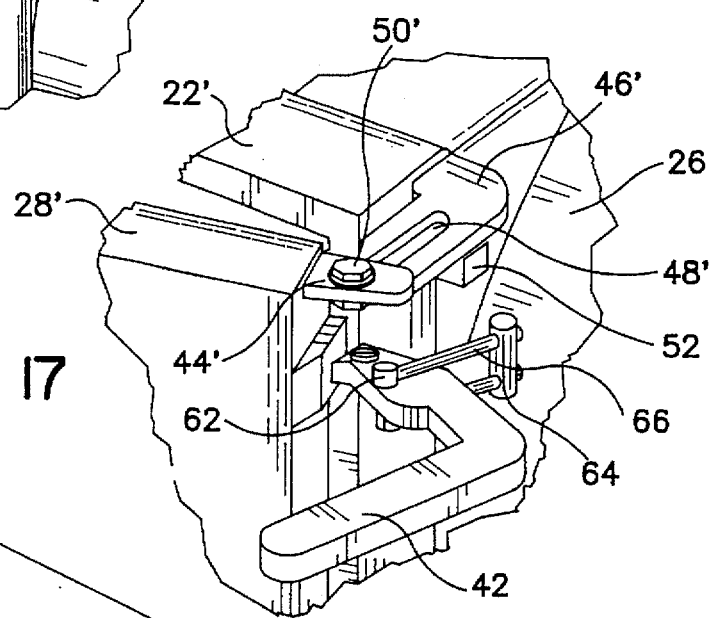
FIG. 17 is an enlarged fragmentary view of the embodiment of FIG. 5 showing the hinge and latch in an open position.
Figure 18:
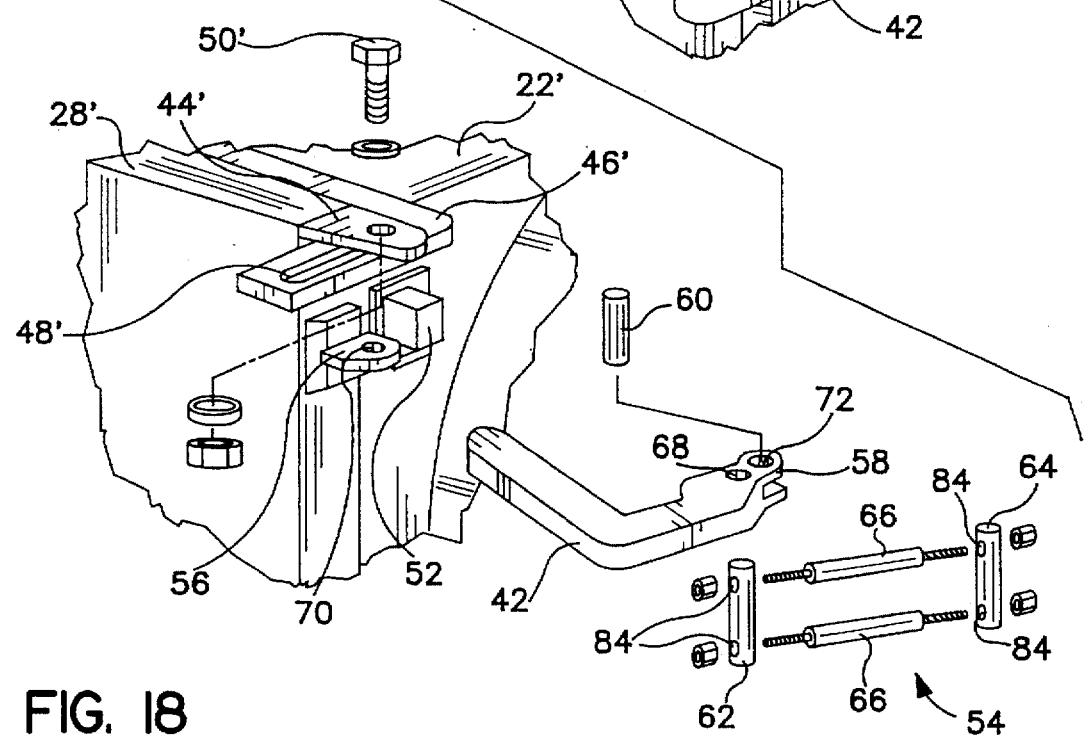
FIG. 18 is an enlarged exploded view of the hinge and latch of the second embodiment of the catalytic converter.

FIGS. 16–18 show enlarged views of the hinges 30' and latch assembly of the second embodiment 20'. FIG. 16 shows the door 28' in a closed position. FIG. 17 shows the door 28' in a partially open position. FIG. 18 is an exploded view showing the components of the hinge 30' and the latch assembly.

The hinge 30' includes a bracket 44' attached to the door 28' and a bracket 46' attached to the central housing 22'. The brackets 44', 46' are attached by, for example, welding. The bracket 46' includes an elongated hole 48'. A fastener 50' is used to connect the brackets 44', 46'. As shown in FIG. 17, when the door 28' is open, the fastener 50' slides in the elongated hole 48' allowing the door to open fully to access the interior of the central housing 22'.

The latch assembly includes a latch 42 which is pivotally mounted to the door 28'. A latch base 56 is mounted on the door 28' and includes a hole 70. The latch handle 42 includes ears 58 defining a slot therebetween and having a hole 72 formed therein. The latch handle 42 is attached to the latch base 56 by a fastener 60 which is inserted through the holes 72, 70, and the latch base 56 fits into the slot formed between the ears 58.

A tension mechanism (means for adjusting the applied torque) 54 is provided for adjusting the tension required to close the latches 42. The tension mechanism 54 includes cylindrical bars or tension bars 62, 64 and threaded fasteners 66. One tension bar 62 is inserted in a hole 68 in the latch handle 42. Both cylindrical bars or tension bars 62, 64 have holes 84 formed in opposite ends thereof for receiving the threaded fasteners 66. The cylindrical bar 64 is used to clamp the latch in place behind a generally C-shaped boss 52 which is mounted on the central housing 22'. The cylindrical bar 64 is placed in the C-shaped boss 52 and then the latch handle 42 is moved toward the door 28' to lock the latch. The pressure applied to the door 28' may be varied by adjusting the threaded fasteners 66.

As shown in FIGS. 5 and 21, the latches 42 are located around the entire periphery of the door 28' such that equal pressure may be maintained completely around the perimeter of the door. Similarly, in the first embodiment 20 shown in FIGS. 4 and 20, the fasteners 40 are located around the entire periphery of the opening so that equal pressure may be applied around the complete periphery. The ability to adjust the torque on the fasteners 40 and the tension of the latches 42 results in positive sealing of the door to the central housing.

While FIGS. 8 and 22 show the first embodiment 20 of the catalytic converter, the following discussion applies to both the first and second embodiments 20, 20'. When used in the horizontal position with a single catalytic converter element 82, the element 82 is generally inserted into the outlet side (downstream side) of the central housing 22,22' and a cross member 96 is attached to the central housing downstream of the element 82 to provide support there for and to help prevent the material of the element 82 from being deformed in a downstream direction by the exhaust gas.

If two catalytic converter elements are required in the horizontal position, then a second element 104 (FIGS. 7 and 23) is inserted into the inlet side (upstream side of the central housing). When two elements are used in the horizontal position, or when one or more elements are used in the vertical position, the inlet side element 104 has mounted thereon a deformation preventing member 106. The deformation preventing member 106 is generally made from a round bar and formed into the shape of a generally curvy X having flanges 122 at the four ends thereof for mounting by way of rivets 124 to holes 126 in the element 104. The deformation preventing member 106 prevents gas flowing through the element 104 from deforming the element axially downstream because the member 106 is mounted against the downstream axial face of the element 104. Also, a cross member 102 may be provided on the inlet side upstream of the inlet side element 104.

Figure 7:
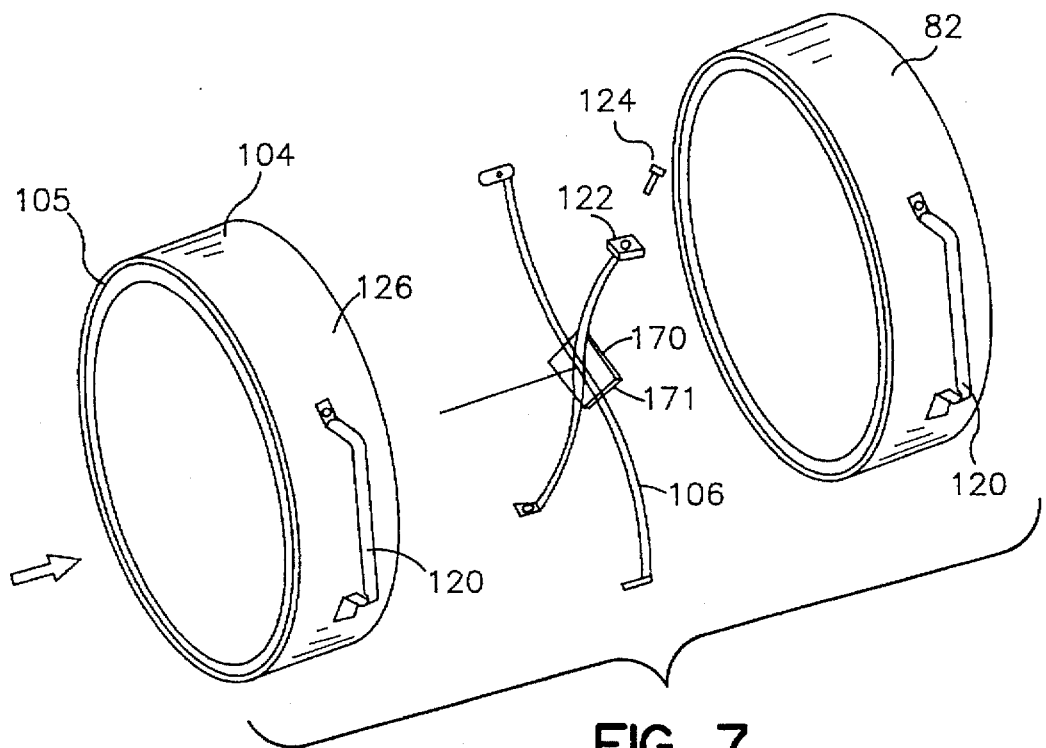
FIG. 7 is a perspective view of the inlet and outlet side catalytic converter elements and the improved deformation prevention member.
Figure 19:
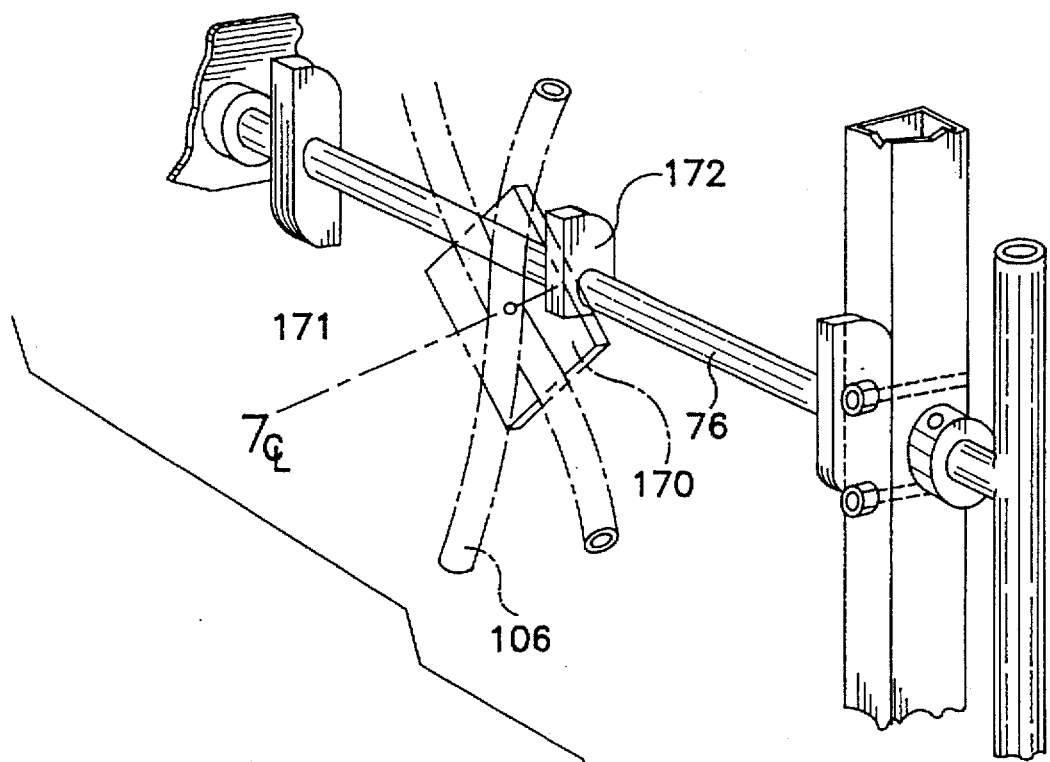
FIG. 19 is a perspective view of the improved deformation prevention means.

In a further embodiment of the invention as shown in FIG. 7, the deformation preventing member 106 includes a midcamshaft landing 170 attached at the centerpoint 171 of the generally curvy X of the deformation preventing member 106. The midcamshaft landing 170 supports the downstream axial face of the catalytic element 104. As shown in FIG. 19, the midcamshaft landing is contacted by a midcamshaft cam 172 mounted on the camshaft 76 when the camshaft 76 is rotated into the locked position. The pressure exerted on the midcamshaft landing 170 by the midcamshaft cam 172 provides increased protection against deformation of the catalytic converter 104 from backfire and exhaust gas explosion.

When the catalytic converter 20, 20' is used in the vertical position and with a single element, then the catalytic converter element 104 is mounted in the inlet or upstream side of the central housing along with a cross member 102 and a deformation preventing member 106. If a second element is then required, an element 82 is mounted in the outlet side of the central housing.

FIGS. 8 and 22 also illustrate the presence of positioning members 99. These positioning members are used to positively align the catalyst elements 82, 104 within the central housing 22. The positioning members are shown in FIGS. 8 and 22 as positioning rods; however, other structures are available to achieve this end, including structural angles and barstock.

Figure 9:
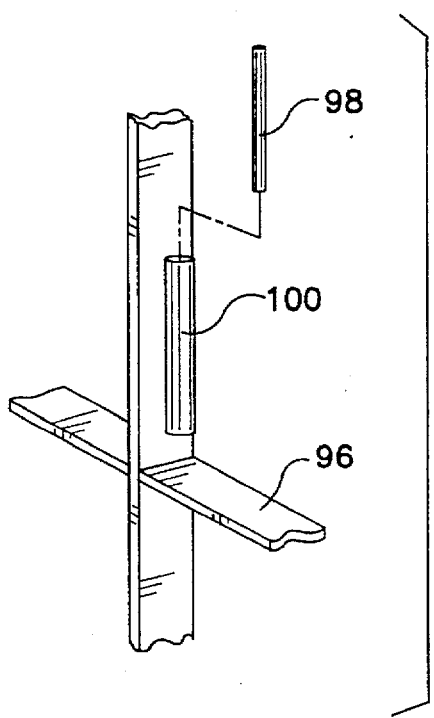
FIG. 9 is a partial view of a cross member showing a temperature detector.

FIG. 9 shows a detailed view of cross member 96. Cross member 96 may include a temperature sensor 98 and a holder 100 therefor. The temperature sensor 98 indicates whether the converter has been operated at temperatures in excess of the recommended operating temperatures. More than one sensor 98 may be included.

Figure 6:
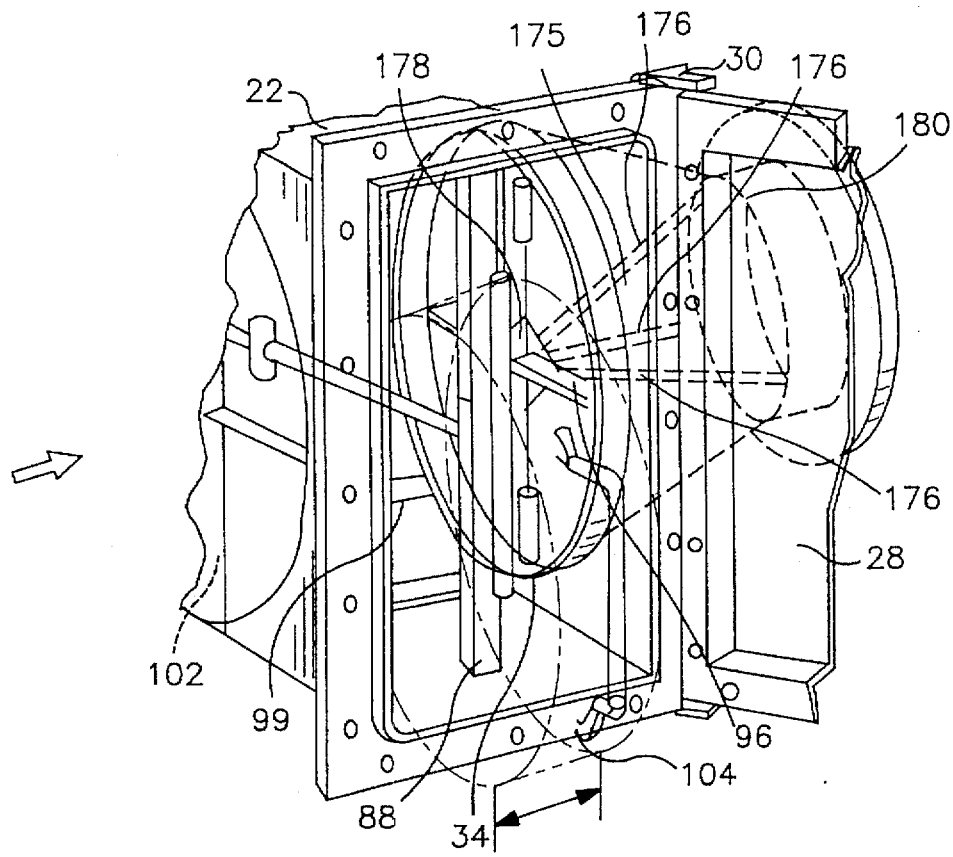
FIG. 6 is a perspective view of the embodiment of the catalytic converter of FIG. 4 showing the camshaft assembly.

In the preferred embodiment as shown in FIG. 6, outlet backfire support means shown generally by the reference numeral 175 are attached between the cross member 96 and a downstream point 180 of the frusto-conical cone which forms the outlet portion 26 of the central housing 22. As shown in FIG. 6, the outlet backfire support means 175 are formed by three metal supports 176. Each metal support 176 is welded to the centerpoint 178 of the cross member 96. The metal supports 176 extend away from the cross member 96 in a pyramidal fashion and are welded at approximately 120° intervals to the interior surface 180 of a downstream portion of the frusto-conical cone which forms the outlet portion 26 of the central housing 22. The outlet backfire support means provides increased backfire and exhaust gas explosion protection for the catalytic element 82.

FIG. 10 is an enlarged view of the outlet side positioning ring 34. The inlet side positioning ring 32 is similar in construction. The outlet side positioning ring 34 is used to position and seal the outlet side catalytic converter element 82. The ring 34 is attached to the central housing 22,22', by, for example, welding. The positioning ring 34 includes an axially extending portion 90 and a radially extending portion 92. The axially extending portion 90 extends around the periphery of the catalytic converter element thereby preventing the element from radially shifting. The radially extending portion 92 abuts an axial face of the catalytic converter element.

A seal 94 is disposed between the axial face of the catalytic converter element and the radially extending portion 92 of the positioning ring 34 to prevent exhaust gas from escaping around the catalytic converter element. The seal is positioned within the central housing by the axially extending portion 90 of the positioning ring 34. The seal 94 may be made of any suitable high temperature material. One such material is sold under the trademark FIBERFRAX and is manufactured by the Carborundum Company, Niagara Falls, N.Y. The FIBERFRAX seal 94 is a compressed fibrous material bound together by organic binders.

As shown in FIGS. 8 and 22, sealing material 110 is included around the perimeter of the door 28. Similar sealing material is also included around the perimeter of the latchup door 28'. The sealing material for the doors 28, 28' may also be any suitable high temperature material that will seal against exhaust gas leakage. A suitable material is sold under the trademark FIBERFRAX and manufactured by the Carborundum Company, Niagara Falls, N.Y. The FIBERFRAX seal 110 is made from a woven material and is in the shape of a tube. Preferably, this material is then flattened into a two-ply structure and attached to the door 28, 28'.

As shown in FIG. 1, advantageously included on the combination catalytic converter and silencer 150 are ports 130 on both the cylindrical housing 154 and outlet portion 26. Also as shown in FIG. 20, similar ports 130 are included on both the inlet portion 24 and outlet portion 26. The ports 130 are for the easy insertion of emission sample tubes, safety thermocouples, and backpressure tubing. It is permissible to use the emissions sample tubes for backpressure readings.

FIG. 13 shows an air or oxygen supply structure 136 for supplying oxygen to the central housing 22, 22'. The structure 136 is designed to maximize air or oxygen dispersion across the element face. One applicable design, as shown in FIG. 13, is a wound tube design. The tube 136 is perforated and supported by a chord 138 which is wound around the supply tube 136. The oxygen is supplied to the oxygen supply tube 136 through an external port 134 (FIGS. 4, 5, 20 and 21) on the exterior of the central housing 22, 22'. In another embodiment, the injector, if viewed from the inlet side of the converter, can be of a perforated doughnut shaped design.

An air or oxygen injector is generally used in a dual element situation to accomplish greater reduction of CO and hydrocarbon. Particularly, the injector allows the converter to function as both a three-way non-selective catalytic reduction (NSCR) catalyst on the inlet side element(s) and a two-way oxidation catalyst on the outlet side(s) element(s).

In operation, the combination catalytic converter and silencer 150 or stand-alone converter 20, is placed downstream of an industrial engine in the exhaust piping. The combination catalytic converter and silencer 150 or stand-alone catalytic converter 22 can be positioned as necessary by engaging lifting eyes 132 with a lifting apparatus. The combination catalytic converter and silencer 150 or stand-alone catalytic converter 20 is selected based upon engine size, exhaust gas characteristics, and environment requirements. The combination catalytic converter and silencer 150 or stand-alone catalytic converter 20 is connected to other exhaust piping by means of the flanges 108 and may be positioned horizontally or vertically in the exhaust piping depending on plant design.

Depending on process demands, either one or more catalytic converter elements may be utilized. As previously discussed, the present combination catalytic converter and silencer 150 and stand-alone catalytic converter 20 can be configured to utilize as many catalytic converter elements as necessary to meet environmental demands. The elements are introduced into the converter through an opening in the central housing on either or both sides of the camshaft assembly. Upon insertion, the element(s) rests on the positioning members to assure positive alignment of the elements in the radial positioning rings by the camshaft assembly. Once the element(s) is so positioned, the handle of the camshaft assembly is rotated to lock the cams on the axial surfaces of the elements to seal the elements axially against the seal material positioned between the axial face of the element and the radially inward face of the positioning ring. In the situation in which an element is positioned in the upstream position, in a preferred embodiment, the deformation preventing member is attached to the element and, upon rotation, the cam 172 acts against the landing 170 to provide additional support. The combination of the positioning rods, the positioning rings and the camshaft assembly assures the proper radial positioning of the elements.

Thereafter, the door is shut to close the opening. The locking structure on the inside of the door engages the cam handle to assure that it remains locked in position during operation.

When closed the door closes against the seal material positioned about its periphery to seal the opening. The door is locked into position by way of bolts or latches, which are positioned to assure uniform peripheral sealing.

The cams are shaped to provide single or dual element positioning and locking depending upon process requirements. Also, in the event of heavy exhaust loads, larger and thicker elements may be required. The camshaft assembly may be modified to handle these larger elements. In one embodiment, the camshaft is simply replaced with a different camshaft having smaller cams.

If elements need to be repaired or replaced, the door is simply unlocked by removing the bolts or unlatching the latches. The door swings open and pulls slightly away from the central housing by way of the slip hinges to provide unimpeded access to the elements. The opening of the door removes the securing member from the camshaft handle. The handle, therefore, can be rotated to its unlocked position, thus freeing the element or elements. The element(s) can then be gripped by the handle attached thereto and simply removed from the housing through the opening. A new or replacement element(s) may be installed by retracing the above-described steps.

Thus, according to one aspect of the present combination catalytic converter and silencer 150 simplifies service and repair while providing the efficiency of a single unit which performs the role of both a silencer and a catalytic converter. According to another aspect of the present invention, the stand-alone catalytic converter also simplifies service and repair. In addition, it provides for much quicker service and repair of the elements by minimizing the number of loose, heavy components to be handled. Additionally, the present invention provides improved backfire and exhaust gas explosion protection to the catalytic converter elements.

While the invention has been disclosed with reference to certain described embodiments, numerous changes, alterations, and modifications of the described embodiments are possible without departing from the spirit and scope of the invention, as defined in the appended claims and equivalents thereof.

What is claimed is:

1. A combination catalytic converter and silencer, comprising:

a silencer; and a catalytic converter connected to said silencer, said catalytic converter, comprising:

at least one catalytic converter element;

a central housing having an inlet side and an outlet side and defining an opening therein of a size to allow insertion and removal of said at least one catalytic converter element;

means for selectively sealing said opening; and means for axially and radially positioning said at least one catalytic converter element in said housing, wherein said positioning means applies a positive force to said at least one catalytic converter element, wherein said means for axially and radially positioning comprises a camshaft assembly disposed within said central housing for applying a positive force to axially position said at least one catalytic converter element.

2. The combination catalytic converter and silencer as set forth in claim 1, wherein said silencer comprises:

a cylindrical housing; and exhaust gas redirection means located in said cylindrical housing.

3. The combination catalytic converter and silencer as set forth in claim 2, wherein said exhaust gas redirection means comprises:

at least one baffle plate having at least one opening therethrough; and a perforated conical member extending from said at least one opening.

4. The combination catalytic converter and silencer as set forth in claim 3, wherein said at least one opening comprises a plurality of openings positioned on said plate and at least one perforated conical member extending from each of said openings.

5. The combination catalytic converter and silencer as set forth in claim 4, wherein said at least one perforated conical member comprises two perforated conical members extending from each of said openings in opposing longitudinal directions.

6. The combination catalytic converter and silencer as set forth in claim 3, wherein said at least one baffle plate comprises first and second baffle plates.

7. The combination catalytic converter and silencer as set forth in claim 6, wherein each of said first and second baffle plates has a plurality of openings positioned on said first and second baffle plates and a perforated conical member extending from each of said openings.

8. The combination catalytic converter and silencer as set forth in claim 7, wherein said plurality of openings comprises three openings positioned on each of said first and second baffle plates and further comprising perforated conical members extending from each of said openings in opposing longitudinal directions.

9. The combination catalytic converter and silencer as set forth in claim 6, wherein said first and second baffle plates are transversely secured in said cylindrical housing.

10. The combination catalytic converter and silencer as set forth in claim 8, wherein said perforated conical members of said second baffle plate are rotated sixty degrees relative to said perforated conical members of said first baffle plate.

11. The combination catalytic converter and silencer as set forth in claim 4, wherein the center of each of said openings is positioned at about the same radial distance from the center of said plate.

12. The combination catalytic converter and silencer as set forth in claim 3, wherein the area of the perforations of said conical member is at least 150% of the area of said at least one opening.

13. The combination catalytic converter and silencer as set forth in claim 2, wherein said cylindrical housing has an inlet and outlet end, and said inlet end of said cylindrical housing has attachment means for connection with an exhaust system of an engine.

14. The combination catalytic converter and silencer as set forth in claim 1, wherein said means for axially and radially positioning further comprises a plurality of rods for aligning said at least one catalytic converter element.

15. The combination catalytic converter and silencer as set forth in claim 1, wherein said camshaft assembly comprises:
a camshaft having ends transversely disposed in said central housing;
means for supporting said camshaft in said central housing;
a cam disposed on each of said ends of said camshaft and a midcamshaft cam disposed between said ends of said camshaft; and
means for rotating said camshaft.

16. The combination catalytic converter and silencer as set forth in claim 15, wherein said at least one catalytic converter element comprises a plurality of catalytic converter elements.

17. The combination catalytic converter and silencer as set forth in claim 16, wherein said plurality of catalytic converter elements comprises an inlet side catalytic converter element and an outlet side catalytic converter element and each of said inlet side and outlet side catalytic converter elements comprises an upstream side and a downstream side, and further comprising a deformation preventing member having a midcamshaft landing positioned adjacent to said downstream side of said inlet side catalytic converter element.

18. The combination catalytic converter and silencer as set forth in claim 1, wherein said at least one catalytic converter element has an upstream side and a downstream side and said at least one catalytic converter element is positioned in said outlet side of said central housing and further comprising a support member attached to an interior surface of said outlet side of said central housing on the downstream side of said at least one catalytic converter element and an outlet backfire support means attached between said support member and a downstream point of said interior surface of said outlet side of said central housing.

19. The combination catalytic converter and silencer as set forth in claim 18, wherein said outlet side of said central housing comprises a frusto-conical cone having an entrance and an outlet and said outlet backfire support means is attached between said support member and an interior surface of said frusto-conical cone.

20. The combination catalytic converter and silencer as set forth in claim 19, wherein said outlet backfire support means comprises a plurality of support braces.

21. The combination catalytic converter and silencer as set forth in claim 20, wherein said plurality of support braces comprises three support braces.

22. The combination catalytic converter and silencer as set forth in claim 1, wherein said at least one catalytic converter element comprises a catalyst substrate peripherally supported by a support band.

23. The combination catalytic converter and silencer as set forth in claim 22, wherein said catalytic converter element includes a handle affixed to said support band for assisting insertion and removal from said opening in said central housing.

24. A combination catalytic converter and silencer, comprising:
a catalytic converter;
a silencer connected to said catalytic converter, said silencer comprising:
a cylindrical housing; and
first and second baffle plates transversely secured in said cylindrical housing and having three openings positioned about each of said plates and each of said three openings having perforated conical members extending in opposing longitudinal directions, wherein said perforated conical members of said second baffle plate are rotated sixty degrees relative to said perforated conical members of said first baffle plate.

25. A catalytic converter, comprising:
at least one catalytic converter element;
a central housing having an inlet side and an outlet side and defining an opening therein of a size to allow insertion and removal of said at least one catalytic converter element;
means for selectively sealing said opening; and
means for axially and radially positioning said at least one catalytic converter element in said housing, wherein said means for axially and radially positioning comprises a camshaft assembly disposed within said central housing for applying a positive force to axially position said at least one catalytic converter element, said camshaft assembly including a camshaft having ends transversely disposed in said central housing, means for supporting said camshaft in said central housing, a cam disposed on each of said ends of said camshaft and a midcamshaft cam disposed between said ends of said camshaft, and means for rotating said camshaft; and
a deformation preventing member having a midcamshaft landing attached to said at least one catalytic converter element.

26. A catalytic converter as set forth in claim 25, wherein said at least one catalytic converter element has an upstream side and a downstream side and said at least one catalytic converter element is positioned in said outlet side of said central housing and further comprising a support member attached to an interior surface of said outlet side of said central housing on the downstream side of at least one catalytic converter element and an outlet backfire support means attached between said support member and a downstream point of said interior surface of said outlet side of said central housing.

27. A catalytic converter as set forth in claim 26, wherein said outlet side comprises a frusto-conical cone having an entrance and an outlet and said outlet backfire support means is attached between said support member and an interior surface of said frusto-conical cone.

28. A catalytic converter as set forth in claim 27, wherein said outlet backfire support means comprises a plurality of support braces.

29. A catalytic converter as set forth in claim 28, wherein said plurality of support braces comprises three support braces.

30. A catalytic converter, comprising:

at least one catalytic converter element;

a central housing having an inlet side and an outlet side and defining an opening therein of a size to allow insertion and removal of said at least one catalytic converter element;

means for selectively sealing said opening; and means for axially and radially positioning said at least one catalytic converter element in said housing, wherein said means for axially and radially positioning comprises a camshaft assembly disposed within said central housing for applying a positive force to axially position said at least one catalytic converter element.

31. The catalytic converter according to claim 30, wherein said means for axially and radially positioning further comprises a plurality of rods for aligning said at least one catalytic converter element.

32. The catalytic converter according to claim 30, wherein said camshaft assembly comprises:

a camshaft transversely disposed in said central housing;

means for supporting said camshaft in said central housing;

at least one cam disposed on said camshaft; and means for rotating said camshaft.

33. The catalytic converter according to claim 32, wherein said means for supporting said camshaft comprises:

a bearing disposed on an interior surface of said central housing for rotatably receiving a first end of said camshaft; and a camshaft support beam disposed within said central housing and including an opening therein for rotatably supporting a second end of said camshaft.

34. The catalytic converter according to claim 33, wherein said opening in said camshaft support beam includes a notched portion for permitting removal of said camshaft from said central housing.

35. The catalytic converter according to claim 32, further comprising locking means for releasably securing the camshaft against rotation.

36. The catalytic converter according to claim 30, wherein said means for axially and radially positioning further comprises at least one positioning ring positioned on an interior surface of said central housing.

37. The catalytic converter according to claim 30, wherein said means for axially and radially positioning further comprises an inlet positioning ring located on the inlet side of said central housing and an outlet positioning ring located on the outlet side of said central housing.

38. The catalytic converter according to claim 37, wherein said at least one positioning ring has a substantially L-shaped cross-section comprising an axially extending portion and a radially inwardly extending portion.

39. The catalytic converter according to claim 38, wherein said at least one catalytic converter element is positioned in said at least one positioning ring, and further comprising means for preventing the flow of gas between said at least one positioning ring and said at least one catalytic converter element.

40. The catalytic converter according to claim 39, wherein said means for preventing the flow of gas comprises a sealing ring disposed between said radially inwardly extending portion of said at least one positioning ring and an axial face of said at least one catalytic converter element.

41. The catalytic converter according to claim 39, wherein said gas flow preventing means is radially positioned by said axially extending portion of said at least one positioning ring.

42. The catalytic converter according to claim 30, wherein said means for selectively sealing said opening comprises:

a door, which includes a peripheral area, for selectively covering said opening; and a seal about said peripheral area of said door for sealing said opening when said door is in the closed position.

43. The catalytic converter according to claim 42, wherein said means for selectively sealing said opening further comprises a plurality of fasteners disposed about said opening in said central housing, said fasteners configured to sealingly secure said door to said central housing when the door is in the closed position.

44. The catalytic converter according to claim 43, wherein said plurality of fasteners comprises:

a plurality of threaded fasteners protruding through a plurality of openings in said central housing in the surrounding area of said opening and extending through a corresponding plurality of holes in said door in the closed position; and a corresponding plurality of nuts threadably attachable to said plurality of threaded fasteners.

45. The catalytic converter according to claim 43, wherein said plurality of fasteners comprises a plurality of over-center latches attached about said peripheral area of said door and a corresponding plurality of bosses protruding from said central housing in the surrounding area of said opening.

46. The catalytic converter according to claim 45, wherein each of said latches includes torque adjusting means.

47. The catalytic converter according to claim 42, wherein said door is attached to said central housing by a hinge.

48. The catalytic converter according to claim 47, wherein said hinge is a slip hinge.

49. The catalytic converter according to claim 30, wherein said at least one catalytic converter element comprises a plurality of catalytic converter elements.

50. The catalytic converter according to claim 49, wherein at least one of said plurality of catalytic converter elements is disposed in said inlet side of said central housing and at least one of said plurality of catalytic converter elements is disposed in said outlet side of said central housing.

51. The catalytic converter according to claim 49, wherein said plurality of catalytic converter elements comprise an inlet side catalytic converter element and an outlet catalytic converter element and each of said inlet side catalytic converter element and said outlet side catalytic converter element comprises an up stream side and a downstream side, and further comprising a deformation preventing member attached to said downstream side of said inlet side catalytic converter element.

52. The catalytic converter according to claim 30, wherein said at least one catalytic converter element is positioned in said outlet side of said central housing and comprises an upstream side and a downstream side, and further comprising a support member attached to an interior surface of said central housing at said outlet side of said central housing and abutting the downstream side of said outlet side catalytic converter element.

53. The catalytic converter according to claim 52, further comprising a support member attached to the interior surface of said central housing at said inlet side of said central housing and abutting the upstream side of said outlet side catalytic converter element.

54. The catalytic converter according to claim 30, wherein said at least one catalytic converter element comprises a catalyst substrate peripherally supported by a support band.

55. The catalytic converter according to claim 54, wherein said catalytic converter element includes a handle affixed to said support band for assisting insertion and removal of said catalytic converter element from said opening in said central housing.

56. The catalytic converter according to claim 30, further comprising axial sealing means positioned at least at said outlet side of said central housing.

57. The catalytic converter according to claim 30, wherein said axial sealing means is positioned between said central housing and said at least one catalytic converter element.

58. A combination of at least one catalytic converter element and a positioning assembly for axially and radially positioning said at least one catalytic converter element in a catalytic converter, comprising,
   a camshaft assembly disposed within a catalytic converter;
   at least one positioning ring positioned on an interior surface of said catalytic converter,
   at least one catalytic converter element positioned between said camshaft assembly and said at least one positioning ring, wherein said camshaft assembly applies a positive force against said at least one catalytic converter element to position said at least one catalytic converter element in said positioning ring.

59. The combination according to claim 58, wherein said at least one positioning ring comprises an inlet positioning ring and an outlet positioning ring.

60. The combination according to claim 58, further comprising a plurality of positioning rods for aligning said at least one catalytic converter element.

61. The combination according to claim 58, wherein said camshaft assembly comprises:
   a camshaft transversely disposed in said catalytic converter;
   means for supporting said camshaft;
   at least one cam disposed on said camshaft; and
   means for rotating said camshaft.

62. A catalytic converter, comprising:
   at least one catalytic converter element;
   a central housing having an inlet side and an outlet side and defining an opening therein of a size to allow insertion and removal of said at least one catalytic converter element;
   means for selectively sealing said opening; and
   means for axially and radially positioning said at least one catalytic converter element in said housing, wherein said means for axially and radially positioning comprises a camshaft assembly and positioning rods disposed within said central housing, and wherein said camshaft assembly comprises a camshaft transversely disposed in said central housing, means for supporting said camshaft in said central housing, at least one cam disposed on said camshaft, and means for rotating said camshaft.

63. The catalytic converter according to claim 62, wherein said means for supporting said camshaft comprises,
   a bearing disposed on an interior surface of said cental housing for rotatably receiving a first end of said camshaft; and
   a camshaft support beam disposed within said central housing and including an opening therein for rotatably supporting a second end of said camshaft.

64. The catalytic converter according to claim 63, wherein said opening in said camshaft support beam includes a notched portion for permitting removal of said camshaft from said central housing.

65. The catalytic converter according to claim 62, further comprising locking means for releasably securing said camshaft against rotation.

66. A combination of at least one catalytic converter element and a positioning assembly for axially and radially positioning said at least one catalytic converter element in a catalytic converter, comprising:
   a camshaft assembly disposed within a catalytic converter;
   at least one positioning ring positioned on an interior surface of said catalytic converter;
   at least one catalytic converter element positioned between said camshaft assembly and said at least one positioning ring, wherein said camshaft assembly comprises a camshaft transversely disposed in said catalytic converter, means for supporting said camshaft, at least one cam disposed on said camshaft, and means for rotating said camshaft.

67. A catalytic converter, comprising:
   at least one catalytic converter element;
   a central housing having an inlet side and an outlet side and defining an opening therein of a size to allow insertion and removal of said at least one catalytic converter element;
   means for selectively sealing said opening; and
   means for axially and radially positioning said at least one catalytic converter element in said housing, wherein said means for axially and radially positioning comprises a camshaft assembly disposed within said central housing, and wherein said camshaft assembly comprises a camshaft transversely disposed in said central housing, means for supporting said camshaft in said central housing, at least one cam disposed on said camshaft, and means for rotating said camshaft.

* * * * *

UNITED STATES PATENT AND TRADEMARK OFFICE
CERTIFICATE OF CORRECTION

PATENT NO. : 5,746,986
DATED : May 5, 1998
INVENTOR(S) : Bobby G. Pollock, et. al.

It is certified that error appears in the above-identified patent and that said Letters Patent is hereby corrected as shown below:

Column 7, line 22, delete "diffuser element" and insert -- perforated inlet --

Signed and Sealed this

Twelfth Day of January, 1999

Attest:

*Attesting Officer*     *Acting Commissioner of Patents and Trademarks*

UNITED STATES PATENT AND TRADEMARK OFFICE
CERTIFICATE OF CORRECTION

PATENT NO. : 5,746,986

DATED : Bobby G. Pollock, et al

INVENTOR(S) : May 5, 1998

It is certified that error appears in the above-identified patent and that said Letters Patent is hereby corrected as shown below:

On the Title Page, Item [75], correct the spelling of inventor Maas' first name from "Cyde" to --- Clyde ---.

Column 18, line 62, change "comprise" to --- comprises ---.

Column 18, line 63, after "outlet' insert --- side ---.

Signed and Sealed this

Ninth Day of March, 1999

Attest:

Q. TODD DICKINSON

*Attesting Officer*　　　　*Acting Commissioner of Patents and Trademarks*